United States Patent
Valiyambath Krishnan et al.

(10) Patent No.: US 10,132,026 B2
(45) Date of Patent: Nov. 20, 2018

(54) SENSOR AND METHOD FOR DETERMINING A FABRIC TYPE

(71) Applicant: KONINKLIJKE PHILIPS N.V., Eindhoven (NL)

(72) Inventors: Mohankumar Valiyambath Krishnan, Eindhoven (NL); Linfang Xu, Eindhoven (NL); Wai Lik William Wong, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/559,107

(22) PCT Filed: Nov. 28, 2016

(86) PCT No.: PCT/EP2016/078922
§ 371 (c)(1),
(2) Date: Sep. 18, 2017

(87) PCT Pub. No.: WO2017/093151
PCT Pub. Date: Jun. 8, 2017

(65) Prior Publication Data
US 2018/0258580 A1    Sep. 13, 2018

(30) Foreign Application Priority Data
Dec. 4, 2015    (EP) ..................... 15198022

(51) Int. Cl.
*D06F 75/26*    (2006.01)
*D06F 75/10*    (2006.01)
*G01B 21/08*    (2006.01)

(52) U.S. Cl.
CPC .............. *D06F 75/26* (2013.01); *D06F 75/10* (2013.01); *G01B 21/08* (2013.01); *D06F 2202/12* (2013.01)

(58) Field of Classification Search
CPC ......... D06F 75/10–75/26; G01B 21/00; G01B 21/02; G01B 21/08; G01B 21/18
See application file for complete search history.

(56) References Cited

U.S. PATENT DOCUMENTS

| 4,651,664 A | 3/1987 | Bergvall |
| 4,980,981 A * | 1/1991 | Naidoo .................. D06F 73/02 223/57 |

(Continued)

FOREIGN PATENT DOCUMENTS

| CN | 104894825 A | * | 9/2015 |
| JP | 07031799 A | * | 2/1995 |
| WO | 2011004295 A1 | | 1/2011 |

*Primary Examiner* — Ismael Izaguirre

(57) ABSTRACT

The invention relates to a fabric sensor (1) for determining a fabric type. The fabric sensor (1) comprises a first structural component (2) comprising a first sensing surface (3), and a second structural component (4) comprising a second sensing surface (5). The first structural component (2) and the second structural component (4) are movable relative to each other to form a closed arrangement wherein the first sensing surface (3) and the second sensing surface (5) hold the fabric. The fabric sensor (1) also comprises a thickness measurement mechanism (6) for measuring a thickness of the fabric when the fabric is held between the first sensing surface (3) and the second sensing surface (5). The fabric sensor (1) also comprises a processing unit (7) coupled to the thickness measurement mechanism (6) and at least one of the first sensing surface (3) and the second sensing surface (5). At least one of the first sensing surface (3) and the second sensing surface (5) is adapted to sense a characteristic of the fabric. The processing unit (7) is configured to determine the fabric type based on the thickness of the fabric and the characteristic of the fabric.

13 Claims, 9 Drawing Sheets

(56) References Cited

U.S. PATENT DOCUMENTS

| | | | |
|---|---|---|---|
| 5,345,060 A | 9/1994 | Hazan | |
| 7,779,565 B2* | 8/2010 | Jiang | D06F 81/08 38/103 |
| 2001/0032403 A1* | 10/2001 | Har | D06F 75/18 38/77.7 |
| 2005/0278987 A1* | 12/2005 | Ching | D06F 75/08 38/77.5 |
| 2014/0223973 A1 | 8/2014 | Alrefaei | |
| 2015/0144610 A1* | 5/2015 | Cho | A45D 1/28 219/222 |
| 2015/0201726 A1* | 7/2015 | Prats | A45D 1/04 219/225 |
| 2015/0345073 A1 | 12/2015 | Al-Zahrani | |

* cited by examiner

SENSOR AND METHOD FOR DETERMINING A FABRIC TYPE

This application is the U.S. National Phase application under 35 U.S.C. § 371 of International Application No. PCT/EP2016/078922, filed on Nov. 28, 2016, which claims the benefit of International Application No. 15198022.4 filed on Dec. 4, 2015. These applications are hereby incorporated by reference herein.

FIELD OF THE INVENTION

The present invention relates to a fabric sensor for determining a fabric type and a method of determining a fabric type using a fabric sensor.

BACKGROUND OF THE INVENTION

In most garment treatment devices, the operating parameters are manually set by the user depending on the garment being treated. For instance, the temperature of an iron is manually set by the user by adjusting the thermostat dial. Manual adjustment of the operating parameter often results in unsuitable parameters being set as the user may be unaware or may have forgotten the optimal parameter to be set for each fabric type.

Further, the user has to remember to look up the recommended ironing setting for each fabric type and to adjust the thermostat dial to the recommended ironing setting. This is a hassle for the user.

OBJECT AND SUMMARY OF THE INVENTION

It is an object of the invention to propose a device for determining a fabric type that avoids or mitigates above-mentioned problems.

The invention is defined by the independent claims. The dependent claims define advantageous embodiments.

According to one aspect of the present invention, there is provided a fabric sensor for determining a fabric type. The fabric sensor may comprise a first structural component comprising a first sensing surface. The fabric sensor also comprises a second structural component comprising a second sensing surface. The first structural component and the second structural component are movable relative to each other to form a closed arrangement, wherein the first sensing surface and the second sensing surface hold the fabric.

The fabric sensor also comprises a thickness measurement mechanism for measuring a thickness of the fabric when the fabric is held between the first sensing surface and the second sensing surface. The fabric sensor also comprises a processing unit configured to determine the property of the fabric type based on the thickness of the fabric measured by the thickness measurement mechanism and the characteristic of the fabric sensed by the at least one of the first sensing surface and the second sensing surface.

By determining the thickness of the fabric and a sensing or detecting characteristic of the fabric, the fabric sensor may be able to more accurately and in a more robust way determine the fabric type. The determination of the fabric by the fabric sensor may allow for automatic adjustment of operating parameters, removing the need for manual adjustment of these parameters by the user. Compared to electrical appliances with a single type of sensor, determination of both the thickness of the fabric and the characteristic of the fabric is more accurate and robust to determine the fabric type. Also, garments of the same fabric type or same characteristics may be treated with optimal operating parameter values to obtain optimal results based on thickness value measurements.

Detecting or sensing the characteristics of the fabric may include measuring and/or determining said characteristics.

Preferably, the characteristic of the fabric is a value proportional to the capacitance between the first sensing surface and the second sensing surface when in the closed arrangement.

This type of capacitance measurement has the advantage of being more easily implemented under the control a processing unit.

Preferably, the first sensing surface and the second sensing surface are adapted to form a sensing mechanism for determining the characteristics, e.g. the electrical characteristic, of the fabric when the first structural component and the second structural component are in the closed arrangement.

The characteristic of the fabric is sensed when the first structural component and the second structural component come together with the fabric sandwiched between them to form the sensing mechanism.

Preferably, the first structural component comprises a first supporting member and a first sensing plate attached to the first supporting member, the second structural component comprises a second supporting member and a second sensing plate attached to the second supporting member. The first sensing surface is a surface of the first sensing plate facing away from the first supporting member. The surface of the first sensing plate facing away from the first supporting member forms the first surface. The second sensing surface is a surface of the second sensing plate facing away from the second supporting member. The surface of the second sensing plate facing away from the second supporting member forms the second sensing surface.

Preferably, the first supporting member is pivotably rotatable relative to the second supporting member to form a clip-like mechanism for sandwiching the fabric.

This solution allows an easy manipulation by user to attach the fabric sensor to a garment.

Preferably, the thickness measurement mechanism is a displacement sensing element, e.g. a displacement sensing sensor, configured to determine the distance between the first sensing surface and the second sensing surface.

The displacement sensing element may measure the distance between the first sensing surface and the second sensing surface when the fabric is sandwiched between the first sensing surface and the second sensing surface, and further determine the thickness of the fabric based on the distance measured.

Preferably, the at least one of the first sensing surface and the second sensing surface is adapted to sense the characteristic, e.g. the electrical characteristics, of the fabric when the fabric is held between the first sensing surface and the second sensing surface.

Preferably, the fabric sensor is a clip or of a clip-like mechanism. The first supporting member may have an end that is joined to or attached to or may be in contact with an end of the second supporting member. The first supporting member may be pivotably rotatable relative to the second supporting member. The first supporting member and the second supporting member may be held about a pivot. In various embodiments, the fabric sensor may be attached or connected to an electrical appliance.

According to another aspect of the present invention, there is provided an electrical appliance comprising the fabric sensor as described herein.

Preferably, the electrical appliance is an appliance for treatment of garment, such as a dry iron, a steam iron, a steam generator, a steamer or a garment sanitizer.

Preferably, the processing unit is configured to adjust an operating parameter of the appliance, e.g. the temperature of the soleplate or the steam rate, based on the characteristic of the fabric and the thickness of the fabric.

This allows optimizing the treatment of garment, such as ironing performance, to the characteristics of the fabric being treated.

Preferably, the electrical appliance comprises an indicator for providing information to an user. The indicator may be electrically coupled to the processing unit.

According to yet another aspect of the present invention, there is provided a method of determining a fabric type using a fabric sensor. The method may comprise holding the fabric between the first sensing surface of a first structural component of said fabric sensor and the second sensing surface of a second structural component of said fabric sensor. The method may further comprise measuring the thickness of the fabric using a thickness measurement mechanism of said fabric sensor. The method may additionally comprise sensing a characteristic of the fabric using at least one of the first sensing surface and the second sensing surface. The method may further comprise determining the fabric type based on the thickness of the fabric measured by the thickness measurement mechanism and the characteristic of the fabric sensed by the at least one of the first sensing surface and the second sensing surface.

BRIEF DESCRIPTION OF THE DRAWINGS

Embodiments of the invention will now be described, by way of example only, with reference to the accompanying drawings in which.

DETAILED DESCRIPTION OF THE EMBODIMENTS

Figure 1:
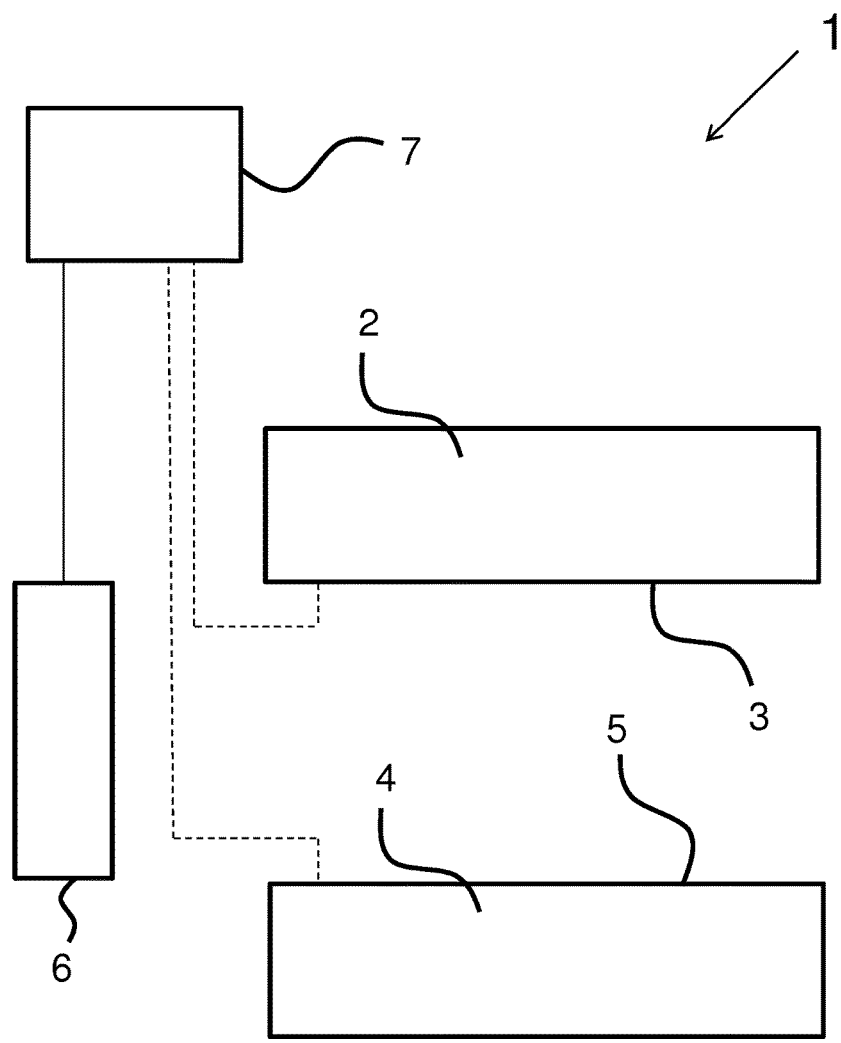
FIG. 1 shows a schematic of a fabric sensor for determining a fabric type according to an embodiment of the present invention.
Figure 2A:
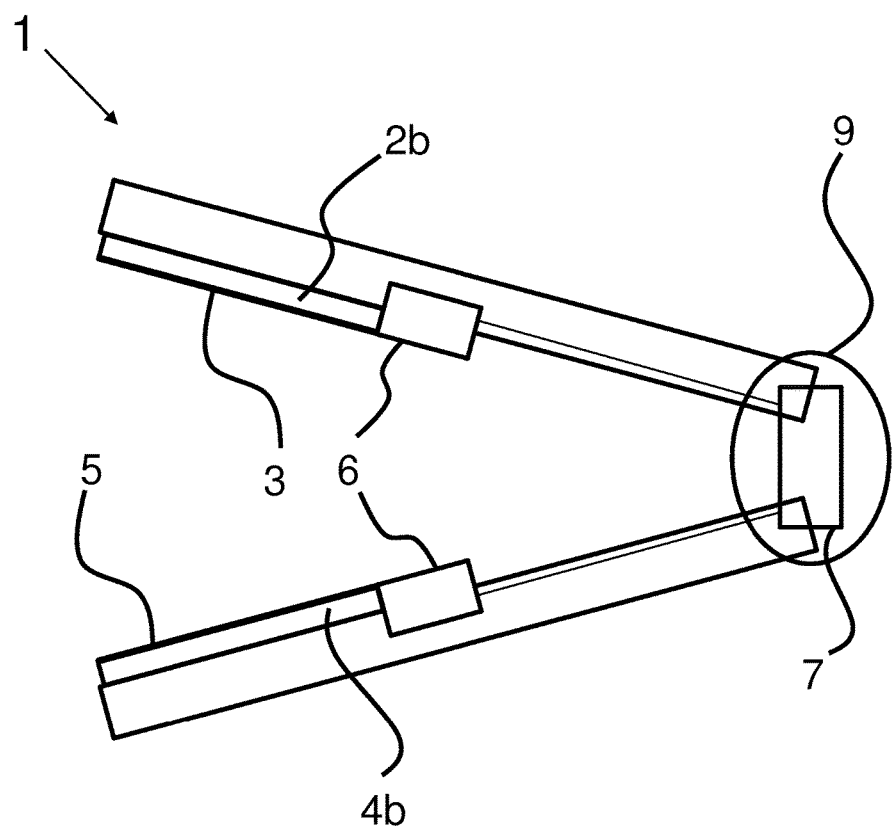
FIG. 2A and FIG. 2B show a schematic of the fabric sensor according to another embodiment of the present invention into two different arrangements.
Figure 2B:
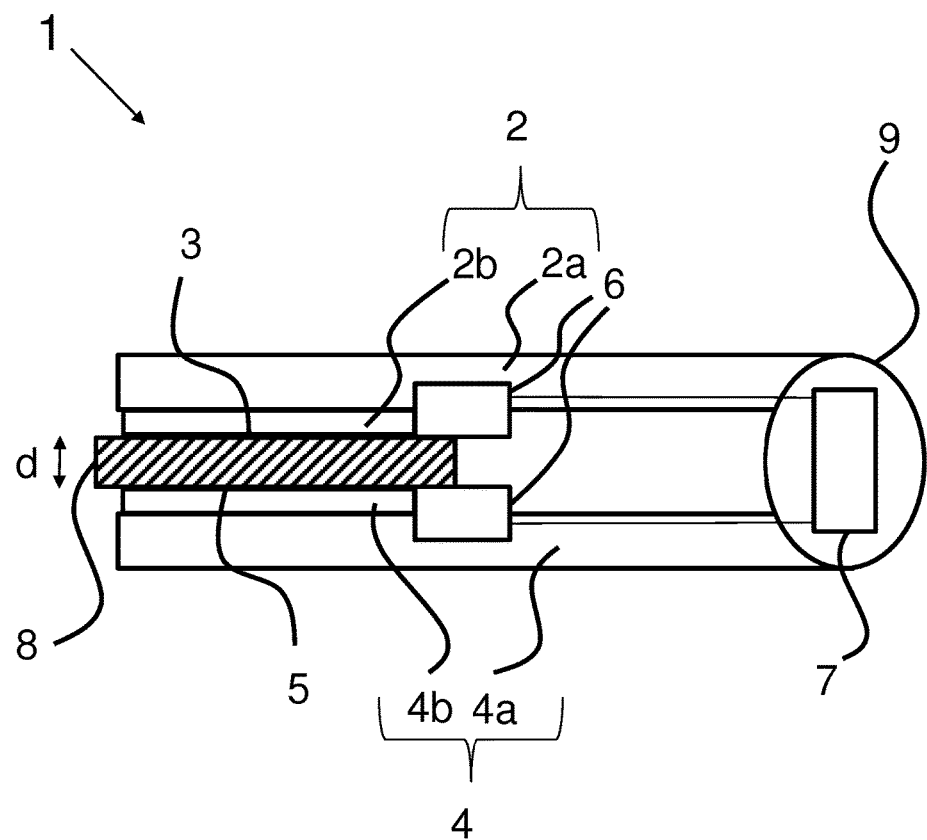

FIG. 1 shows a schematic of a fabric sensor (1) for determining a fabric type according to an embodiment of the present invention. The fabric sensor (1) comprises a first structural component (2) having a first sensing surface (3). The fabric sensor (1) further comprises a second structural component (4) having a second sensing surface (5), the second structural component (4) configured to be movable relative to the first structural component (2) to form a closed arrangement, whereby the first sensing surface (3) cooperates with the second sensing surface (5) to hold the fabric between the first sensing surface (3) and the second sensing surface (5). The fabric sensor (1) additionally comprises a thickness measurement mechanism (6) for measuring (or determining) a thickness of the fabric when the fabric is held between the first sensing surface (3) and the second sensing surface (5). The fabric sensor (1) further comprises a processing unit (7) coupled to the thickness measurement mechanism (6) and at least one of the first sensing surface (3) and the second sensing surface (5). At least one of the first sensing surface (3) and the second sensing surface (5) is adapted to sense a characteristic of the fabric. The processing unit (7) is configured to determine the fabric type based on the thickness of the fabric measured by the thickness measurement mechanism (6) and the characteristic of the fabric sensed by the at least one of the first sensing surface (3) and the second sensing surface (5). The measurement mechanism (6) may either be arranged:

remote from the first structural component (2) and the second structural component (4), as schematically illustrated on FIG. 1, partly on the first structural component (2) and partly on the second structural component (4), as schematically illustrated on FIG. 2A-2B: in this case, the measurement mechanism (6) is either adapted to measure the thickness when the fabric is sandwiched in-between, or adapted to measure the thickness without the need of having the fabric be sandwiched in-between, on the first structural component (2) only, on the second structural component (4) only.

Determining the fabric type may refer to determining or identifying the type of material (delicates, tough, cellulosic such as linen or cotton, non-cellulosic, natural fibres such as wool or silk, synthetics such as polyester or nylon or acrylic . . . ). An operating parameter (e.g. temperature of a heated plate or temperature of steam or steam rate of the garment treatment device) associated with the fabric may then be correspondingly be determined/set. A value or range of values of an operating parameter may be associated or linked to a particular value or range of values of the thickness of the fabric determined and a particular value or range of values of the characteristic of the fabric determined.

In other words, embodiments relate to the identification of the fabric type or determination of properties of the fabric or determination of operating parameters to be applied to an appliance that is used for treating (e.g. ironing) a fabric. Determination of the fabric is based on a combination of the thickness of the fabric determined by the fabric sensor (1) via the thickness measurement mechanism (6) and the characteristic of the fabric detected or sensed by the fabric sensor (1).

Various embodiments of the present invention may allow treatment of the garments by the user without the hassle to adjust settings, and at the same time obtain best treatment results appropriate to the fabric type being treated.

The fabric is sandwiched by the first sensing surface (3) of the first structural component (2) and the second sensing surface (5) of the second structural component (4) when the fabric sensor (1) is in the closed arrangement. The thickness measurement mechanism (6) is for measuring (or determining) a thickness of the fabric when the fabric sensor (1) is in the closed arrangement. A characteristic of the fabric is detected or sensed by the first sensing surface (3) or the second sensing surface (5) or both the first sensing surface (3) and the second sensing surface (5). The processing unit (7) is used to determine the fabric type based on measurements provided by the thickness measurement mechanism (6) and data on characteristics of the fabric detected/sensed provided by the at least one of the first sensing surface (3) and the second sensing surface (5).

The first sensing surface (3) and/or the second sensing surface (5) may be sensing surface(s)for sensing or detecting the characteristics of the fabric. Each sensing surface may include one or more sensors. Alternatively, each sensing surface may be part of a sensor.

The processing unit (7) may be referred to as or may include a processor or a processing circuit or a processing circuit arrangement. The processing unit (7) may be electrically coupled via an electrical connection to the thickness measurement mechanism (6) (as shown by the solid line in FIG. 1). As shown by the dotted line in FIG. 1, the processing unit (7) may also be electrically coupled via an electrical connection to the first sensing surface (3). However, the processing unit (7) may be additionally or alternatively be electrically coupled via an electrical connection to the second sensing surface (5).

It may also be the case that the processing unit (7) is configured to communicate with the thickness measurement mechanism (6) via wireless means, e.g. via Bluetooth, WiFi, infrared, near field communications (NFC) etc. The processing unit (7) may also be configured to communicate with the first sensing surface (3) or the second sensing surface (5) or both the first sensing surface (3) and the second sensing surface (5) via wireless means.

When the first structural component (2) and the second structural component (4) are in an open arrangement, as schematically illustrated in FIG. 1, the first structural component (2) is spaced apart from the second structural component (4) and the fabric is not held between the first sensing surface (3) and the second sensing surface (5). The first sensing surface (3) may be at a first predetermined distance from the second sensing surface (5) when the first structural component (2) and the second structural component (4) are in an open arrangement.

The characteristic of the fabric may refer to an electrical characteristic, such as a value proportional to the capacitance between the first sensing surface (3) and the second sensing surface (5) when in the closed arrangement.

The first sensing surface (3) and/or the second sensing surface (5) may be adapted to sense the characteristic of the fabric when the fabric is held between the first sensing surface (3) and the second sensing surface (5).

The first sensing surface (3) and the second sensing surface (5) may be adapted to form a sensing mechanism for determining the characteristic of the fabric when the first structural component and the second structural component are in the closed arrangement. The first sensing surface (3) may face the second sensing surface (5). The first sensing surface (3) and the second sensing surface (5) may be adapted to come together to sandwich the fabric in order to sense the characteristic of the fabric. In other words, the determination of the characteristic of the fabric is carried out when the first structural component (2) and the second structural component (4) are in the closed arrangement.

In various embodiments, the first sensing surface (3) and the second sensing surface (5) may be adapted to a value proportional to the capacitance between the first sensing surface (3) and the second sensing surface (5) when in the closed arrangement. The first sensing surface (3) of the first structural component (2) may be in contact with a first side of the fabric and the second sensing surface (5) of the second structural component (4) may be in contact with a second side of the fabric, which is opposite the first side of the fabric. The sensing mechanism may be a capacitance sensing mechanism.

It may also be the case that the characteristic of the fabric is detected/sensed by only one of the first sensing surface (3) and the second sensing surface (5). When a current is directed by the electrodes through the fabric, the resistance of the fabric may be determined.

In various embodiments, the first structural component (2) may comprise a first supporting member and a first sensing plate attached to the first supporting member. The second structural component (4) may comprise a second supporting member and a second sensing plate attached to the second supporting member. The first sensing surface (3) may be a surface of the first sensing plate facing away from the first supporting member. The second sensing surface (5) may be a surface of the second sensing plate facing away from the second supporting member.

FIG. 2A and FIG. 2B show a schematic of the fabric sensor (1) for determining a fabric type according to another embodiment of the present invention. FIG. 2A represents the fabric sensor in an opened arrangement. FIG. 2B represents the fabric sensor in an closed arrangement. Like features in this embodiment retain the same reference numerals. The fabric sensor (1) may be a device of a clip-like mechanism. FIG. 2B shows the device (1) in a closed arrangement clipping a fabric (8). The first structural component (2) comprises a first supporting member (2a) and a first sensing plate (2b) attached to the first supporting member (2a). The surface of the first sensing plate (2b) faces away from the first supporting member (2a) forms the first sensing surface (3). The second structural component (4) comprises a second supporting member (4a) and a second sensing plate (4b) attached to the second supporting member (4a). The surface of the second sensing plate (4b) faces away from the second supporting member (4a) forms the second sensing surface (5).

The first supporting member (2a) may have an end that is joined to or attached to or may be in contact with an end of the second supporting member (2b). In the embodiment shown in FIG. 2A-2B, the device (1) comprises a pivot (9). The first supporting member (2a) and the second supporting member (4a) may be held about the pivot (9). The first supporting member (2a) may be pivotably rotatable relative to the second supporting member (4a).

The thickness measurement mechanism (6) is a displacement sensing element configured to determine the distance (d) between the first sensing surface (3) and the second sensing surface (5). The displacement sensing element may be a sensor for measuring the distance between the first sensing surface (3) and the second sensing surface (5), i.e. the distance between the first sensing surface (3) and the second sensing surface (5) when the first sensing surface (3) and the second sensing surface (5) are sandwiching the fabric. For example, as illustrated on FIG. 2, the thickness measurement mechanism (6) comprises two sensor elements facing each other, a first element arranges on the first supporting member (2a), and a second element arranged on the second supporting member (4a). Both elements are electrically connected to the processing unit (7).

The processing unit (7) is configured to identify the fabric based on the thickness of the fabric measured by the thickness measurement mechanism (6) and the characteristic of the fabric sensed by the at least one of the first sensing surface (3) and the second sensing surface (5). The sensors used in the thickness measurement mechanism (6) for determining the thickness of the fabric (8) may be embedded or attached to the device (1). The sensors may be electrically coupled to the processor (7).

Figure 5A:
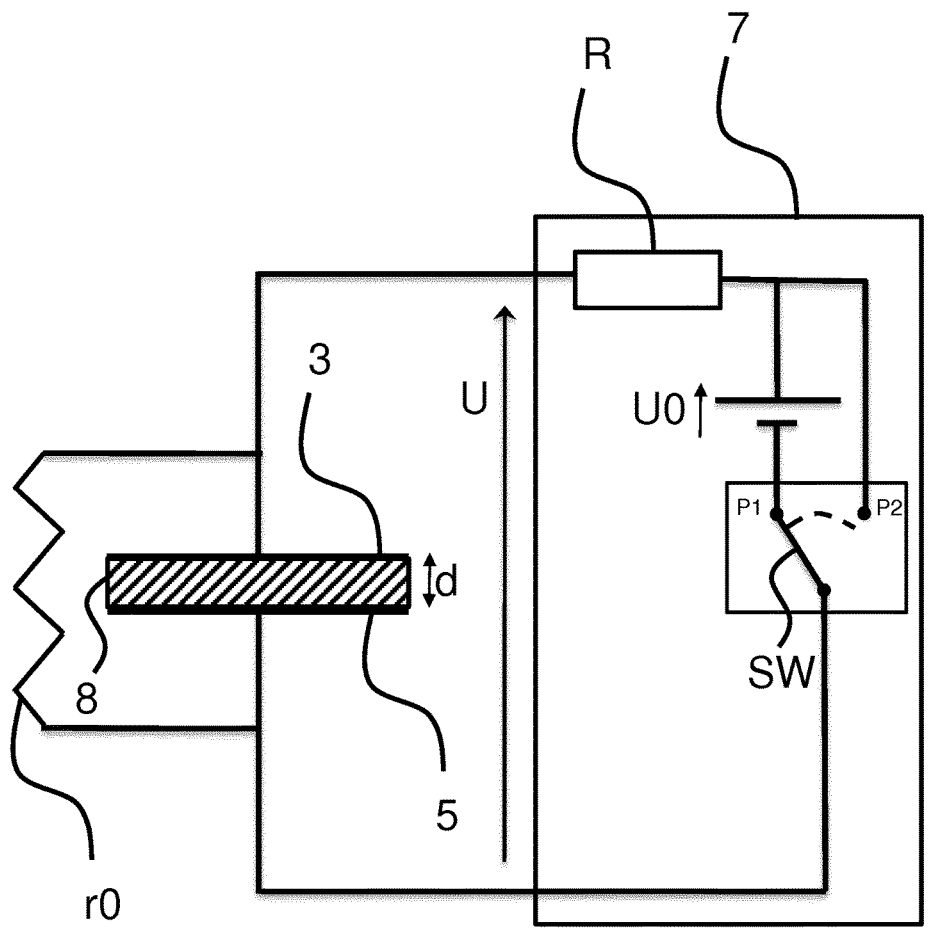
FIG. 5A and FIG. 5B illustrate how sensing a characteristic of a fabric is done according to the invention, from electrical perspectives.
Figure 5B:
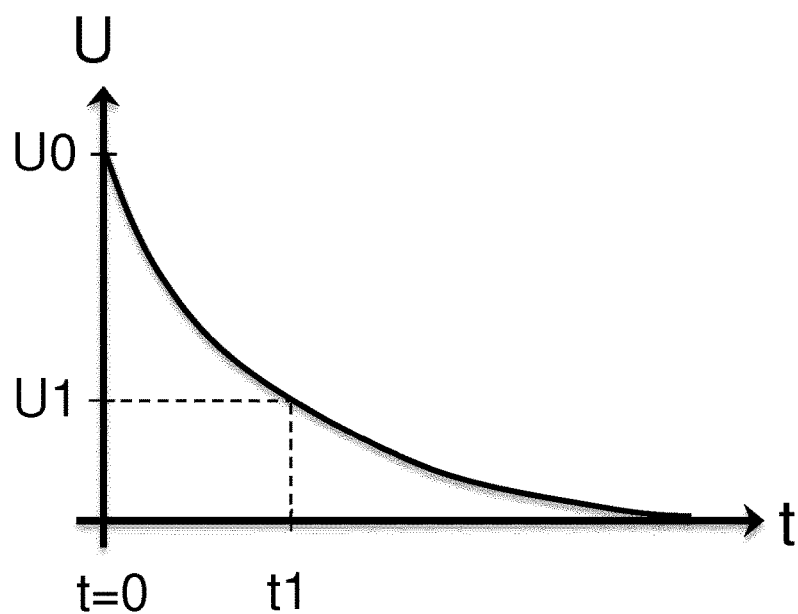

FIG. 5A and FIG. 5B illustrate how sensing a characteristic of a fabric is done according to the invention, from electrical perspectives.

FIG. 5A represents the fabric (8) being sandwiched between the first sensing surface (3) and the second sensing surface (5) in the closed arrangement. From electrical point of view, the first sensing surface (3) and the second sensing surface (5) and the fabric (8) form as an equivalent capacitor having a capacitance value C, with a leak resistance (r0) in parallel with said capacitor. Since the leak resistance (r0) is of relatively high value, it actually does not influence the charge/discharge of the capacitor. The first sensing surface (3) and the second sensing surface (5) are electrically connected to the processing unit (7). The processing unit (7) is arranged to behave as a voltage generator having nominal voltage U0 and internal resistance R.

As indicated previously, the characteristic of the fabric may correspond to a value proportional to the capacitance C between the first sensing surface (3) and the second sensing surface (5) when sandwiching the fabric in the closed arrangement. In order to calculate this value proportional to the capacitance C, the processing unit (7) initially applies a voltage U=U0 between the first sensing surface (3) and the second sensing surface (5), via commuting an internal switch (SW) in a first position P1. This is equivalent to charging the capacitor C up to a voltage having value U0. The processing unit (7) then commutes the internal switch (SW) to a second position P2 that closes the circuit formed by the capacitance C and the resistance R. In this configuration, the capacitance C starts to discharge in the resistance R. The processing unit (7) then measures along the time the variation of voltage U between the first sensing surface (3) and the second sensing surface (5). In other words, the processing unit (7) is adapted to measure the discharge of the capacitor C in the resistance R. In the present case, the voltage U follows the equation: $U=U0*e(-t/RC)$, as illustrated in FIG. 5B.

When the voltage U has decreased by a certain percentage to reach a decreased value U1, the corresponding time t1 elapsed since the internal switch (SW) has returned to the second position P2 is measured by the processing unit (7). For example:

when voltage U1=U0*63%, the elapsed time t1 equals R*C, when voltage U1=U0*86%, the elapsed time t1 equals 2*R*C.

The elapsed time t1 being proportional to the capacitance C between the first sensing surface (3) and the second sensing surface (5), it is used as the characteristic of the fabric (8).

Note that instead of measuring the discharge of the capacitor C in the resistance R, an alternative solution (not shown) could consist in measuring the charge of the capacitor C in the resistance R.

As mentioned previously, the processing unit (7) is configured to determine the fabric type based on the thickness (d) of the fabric and the characteristic of the fabric. To this end, the processing unit (7) is configured to calculate a coefficient CF by multiplying the elapsed time t1 to the thickness d of the fabric:

$$CF=t1*d$$

The fabric type can then be determined by the processing unit (7) based on the value of the coefficient CF. To this end, different approaches can be considered.

Figure 6A:
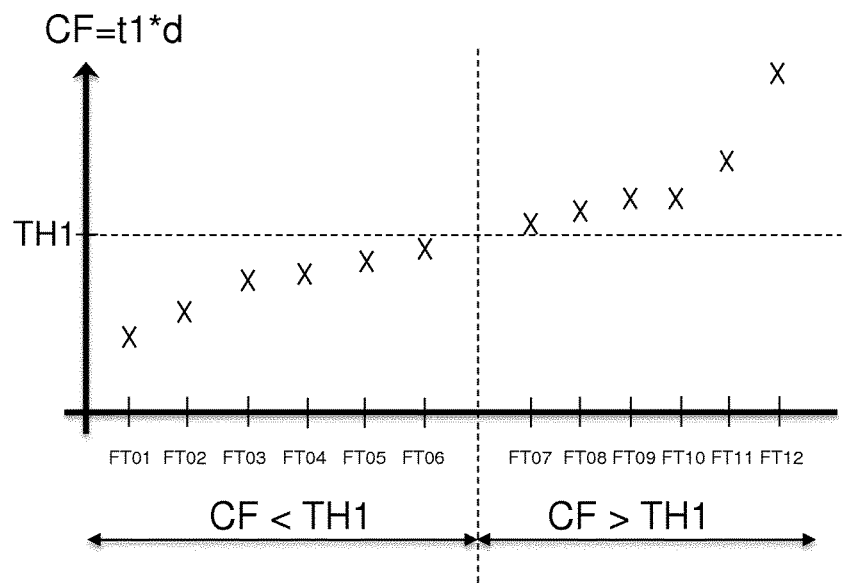
FIG. 6A and FIG. 6B illustrate examples for determining a fabric type according to the invention.

A first approach, illustrated in FIG. 6A, is based on the fact that different fabric types can be grouped in a same category if their respective coefficients CF are in a same range of values.

For example, the following fabric types can be classified in a first category "Delicates":

FT01=100% Acrylic,
FT02=100% Wool,
FT03=100% Nylon,
FT04=100% Silk,
FT05=100% Acetate,
FT06=100% Polyester.

For example, the following fabric types can be classified in a second category "Tough":

FT07=55% Cotton+45% Linen,
FT08=Blends with cotton,
FT09=100% Viscose,
FT10=100% Linen,
FT11=100% Cotton,
FT12=100% Jeans.

The first approach consists in comparing the coefficient CF of the fabric type to be determined to a threshold TH1. The threshold TH1 has a value between the coefficient of fabric type FT06 and the coefficient of fabric type FT07. For example, the threshold TH1 is pre-stored in a memory of the processing unit (7). If the coefficient CF of the fabric type to be determined is smaller than the threshold TH1, the fabric type is classified in the first category of fabrics. If the coefficient CF is larger than the threshold TH1, the fabric type is classified in the second category of fabrics.

Figure 6B:
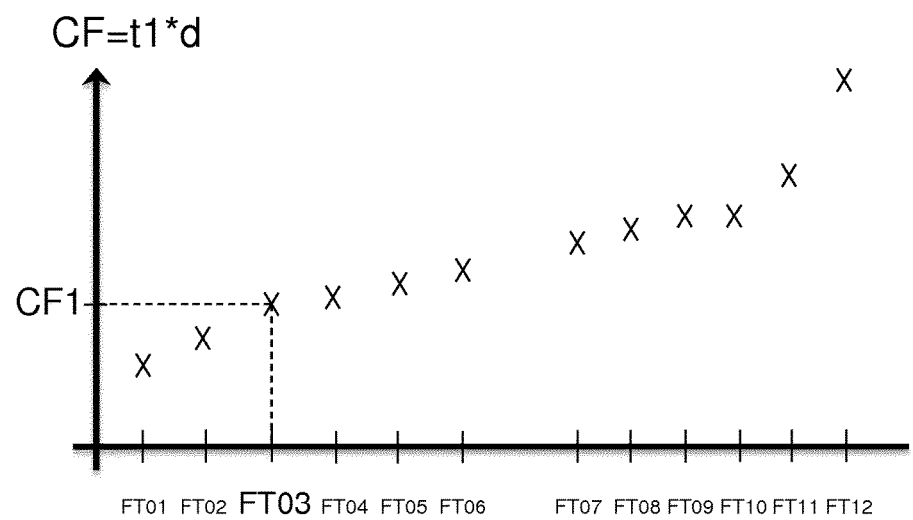

A second approach, illustrated in FIG. 6B, is based on a direct determination of the fabric type based on the value of the coefficient CF. This approach implies that a table containing a list of fabric types and their respective coefficients CF is available, for example pre-stored in a memory of the processing unit (7). This table is used by the processing unit (7) as a look-up table to retrieve the fabric type corresponding to the coefficient CF of the fabric type to be determined. For example, as illustrated in FIG. 6B, the coefficient CF=CF1 of the fabric type to be determined corresponds to the fabric type TF03 in the look-up table.

The device (1) may also comprise a biasing mechanism (not shown in FIG. 2A-2B) to bias the first structural component (2) and the second structural component (4). The biasing mechanism may be connected or be attached to both the first structural component (2) and the second structural component (4). For instance, the bias mechanism, e.g. a spring, may provide a bias so that in the absence of an external force, the first structural component (2) is biased towards the second structural component (4). The user may have to exert a force to separate the first structural component (2) and the second structural components (4) for subsequent sandwiching of the fabric (8) between the first structural component (2) and the second structural components (4). The biasing mechanism may help secure the fabric between the first structural component (2) and the second structural component (4).

The fabric sensor (1) may be part of an electrical appliance such as a steam generating appliance like a steam iron, a pressurized steam generator, a garment steamer or a garment sanitizer. The electrical appliance may include the fabric sensor (1). The processing unit (7) may be configured to adjust or select at least one operating parameter of the appliance based on the thickness of the fabric (8) and the characteristic of the fabric (8). For example, the operating parameter of the appliance may relate to the soleplate temperature, the steam rate, and/or the steam temperature.

The processing unit (7) may be configured to control a component, such as a heater or boiler to the adjusted or selected value or range of values. The processing unit (7) may be configured to classify different types of fabric (8), then to select or adjust the operating parameter for garment treatment to the same value or same range of values if the fabric types are in the same group.

For example, the electrical appliance is a garment care device corresponding to a dry iron having a soleplate, and wherein the operating parameter is the soleplate temperature.

For example, the electrical appliance is a garment care device comprising a soleplate and a steam generator, the garment care device being taken among the set of devices defined by steam iron, steam generator, steamer and garment sanitizer, and wherein the operating parameter is taken among the set of parameters defined by soleplate temperature, steam rate and steam temperature.

Various embodiments of the present invention may have certain advantages compared to current solutions in which adjustment is done without utilization of fabric sensors. Automatic adjustment based on the thickness of the fabric (8) and the characteristic of the fabric (8) may allow for higher steam rates or higher temperatures for fabrics such as linen for good dewrinkling results. More generally, an automatic adjustment based on the thickness of the fabric (8) and the characteristic of the fabric (8) may allow for ironing to be carried out with less steam and/or a lower temperature for thin or "delicate" fabrics, compared to thick and "tough" fabrics that can accept more steam and/or a higher temperature.

The electrical appliance may further comprise an indicator (e.g. a visual indicator such as a user display) (not shown in FIG. 2A-2B) for providing information to a user, the indicator electrically coupled to the processing unit (7). The indicator may provide the user information such as the type of fabric (8) identified, the current setting of the operating parameter, the electrical characteristic of the fabric (8) determined, and/or the thickness of the fabric (8) determined. The indicator may alternatively or additionally include audio feedback, e.g. to inform the user of the fabric type being treated.

Figure 3:
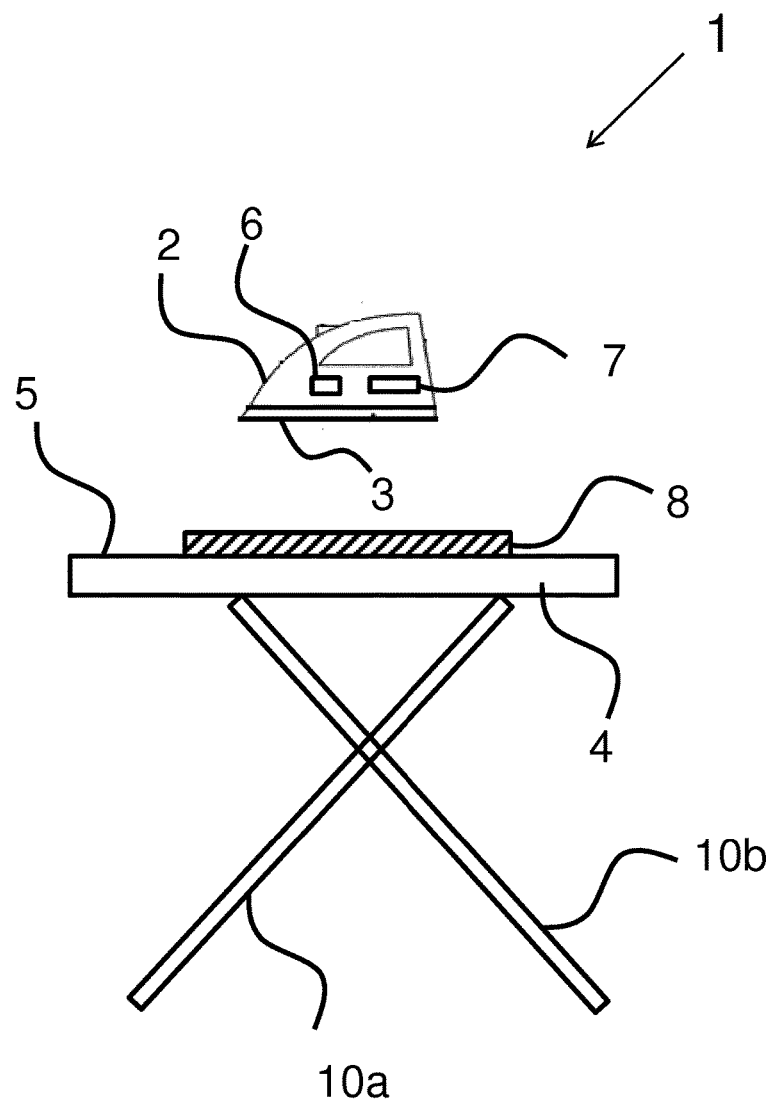
FIG. 3 shows a schematic of the fabric sensor for determining a fabric type according to yet another embodiment of the present invention.

FIG. 3 shows a schematic of the fabric sensor (1) for determining a fabric type according to yet another embodiment of the present invention. Like features in this embodiment retain the same reference numerals. The fabric sensor may include or be parts of two devices. As shown in FIG. 3, the first structural component (2) may be an iron and the first sensing surface (3) may be the soleplate of the iron. Alternatively, the first sensing surface (3) may be a separate component aligned along or at a predetermined angle to the plane of the soleplate (not shown). The second structural component (4) may be an ironing board and the second sensing surface (5) may be an ironing surface of the ironing board on which garments are disposed during ironing. Alternatively, the second sensing surface (5) may be a separate component (not shown) aligned along or at a predetermined angle to the plane of the ironing board. The processing unit (7) and the thickness measurement mechanism (6) may preferably be within the iron (2). In other embodiments (not shown), the processing unit (7) and/or the thickness measurement mechanism (6) may be within the ironing board. Communication between the processing unit (7) with the first sensing surface (3), the second sensing surface (5) and/or the thickness measurement mechanism (6) may be carried out using electrical connections and/or wireless means. The ironing board further comprises legs (10a, 10b).

In one example, the electrical characteristics of the fabric (8) may be detected or sensed by the soleplate (3). The information on electrical characteristics may be communicated to the processing unit (7) within the iron (2) via an electrical connection connecting the soleplate (3) and the processing unit (7). The thickness measurement sensor (6) for determining the thickness of the fabric (8) may be within the iron (2). The thickness of the fabric (8) may be determined during the ironing process, i.e. when the thickness of the fabric (8) is in contact with the iron (2) on a first side of the fabric (8) and the ironing board (4) on a second side of the fabric (8). Information on the thickness may be communicated to the processing unit (7) via an electrical connection connecting the thickness measurement sensor (6) and the processing unit (7). The processing unit (7) may be configured to determine or identify the type of the fabric (8) based on the electrical characteristics and the thickness of the fabric (8).

Figure 4:
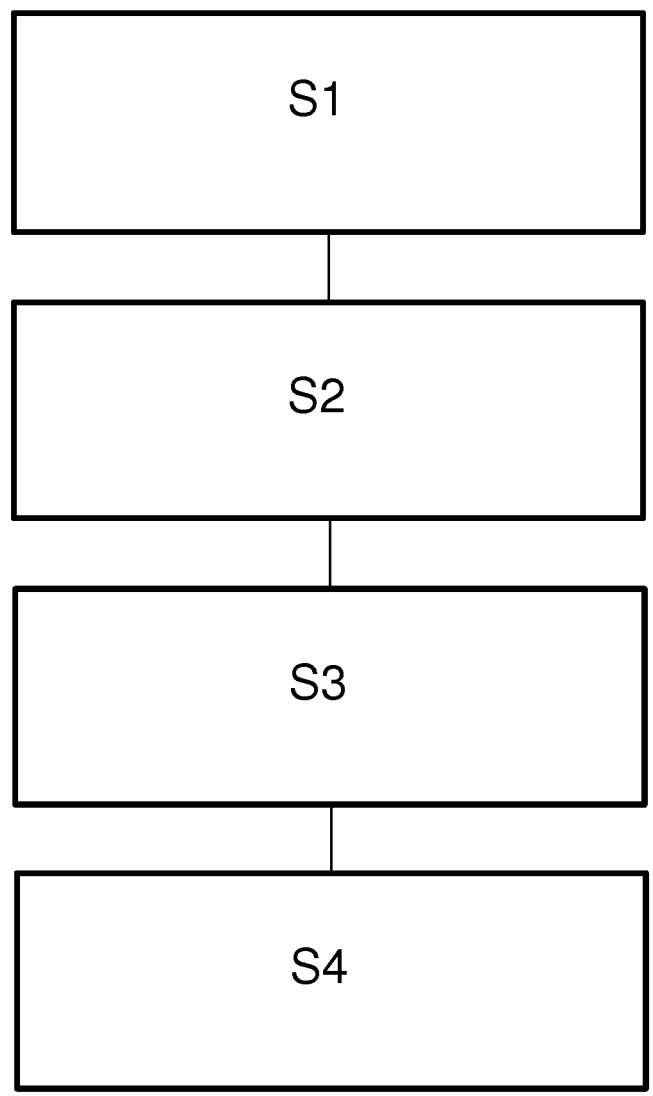
FIG. 4 shows a flow diagram according to yet another aspect of the present invention.

FIG. 4 shows a flow diagram according to yet another aspect of the present invention. FIG. 4 shows a method of determining type of a fabric (8) using a fabric sensor (1). The method comprises the following steps:

in S1, holding the fabric (8) between the first sensing surface (3) of a first structural component (2) of said fabric sensor (1) and the second sensing surface (5) of a second structural component (4) of said fabric sensor (1);

in S2, measuring or determining the thickness of the fabric (8) using a thickness measurement mechanism (6) of said fabric sensor (1);

in S3, sensing a characteristic of the fabric (8) using at least one of the first sensing surface (3) and the second sensing surface (5); and in S4, determining the fabric type based on the thickness of the fabric (8) measured by the thickness measurement mechanism (6) and the characteristic of the fabric (8) sensed by the at least one of the first sensing surface (3) and the second sensing surface (5).

The fabric (8) may be held between the first sensing surface (3) of a first structural component (2) of said fabric sensor (1) and the second sensing surface (5) of a second structural component (4) of said fabric sensor (1) in order to determine the thickness of the fabric. In addition, a characteristic of the fabric (8) such as an electrical characteristic or a material property of the fabric (8) may be sensed via first sensing surface (3) and/or second sensing surface (5). Information on the thickness and the characteristic of the fabric (8) may then be communicated to the processing unit (7) for the processing unit (7) to make a determination of the fabric type.

Various embodiments may provide for detection of fabric type and adjustment of treatment parameters for applications such as ironing, garment steaming, drying, refreshing, washing etc.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the spirit and scope of the technique approaches of the present invention, which will also fall into the protective scope of the claims of the present invention. In the claims, the word "comprising"

does not exclude other elements or steps, and the indefinite article "a" or "an" does not exclude a plurality. Any reference signs in the claims should not be construed as limiting the scope.

The invention claimed is:

1. A fabric sensor for determining a fabric type, the fabric sensor comprising:
   a first structural component comprising a first sensing surface;
   a second structural component comprising a second sensing surface, the first structural component and the second structural component being movable relative to each other to form a closed arrangement wherein the first sensing surface and the second sensing surface hold the fabric;
   a thickness measurement mechanism for measuring a thickness of the fabric when the fabric is held between the first sensing surface and the second sensing surface; and
   a processing unit coupled to the thickness measurement mechanism and at least one of the first sensing surface and the second sensing surface;
   wherein at least one of the first sensing surface and the second sensing surface is adapted to sense a characteristic of the fabric; and
   wherein the processing unit is configured to determine the fabric type based on said thickness (d) of the fabric and said characteristic of the fabric.

2. The fabric sensor according to claim 1, wherein the characteristic of the fabric is a value proportional to the capacitance between the first sensing surface and the second sensing surface when in the closed arrangement.

3. The fabric sensor according to claim 1, wherein the first sensing surface and the second sensing surface are adapted to form a sensing mechanism for detecting the characteristic of the fabric when the first structural component and the second structural component are in the closed arrangement.

4. The fabric sensor according to claim 1, wherein:
   the first structural component comprises a first supporting member and a first sensing plate attached to the first supporting member;
   the second structural component comprises a second supporting member and a second sensing plate attached to the second supporting member;
   the first sensing surface is a surface of the first sensing plate facing away from the first supporting member; and
   the second sensing surface is a surface of the second sensing plate facing away from the second supporting member.

5. The fabric sensor according to claim 4, wherein the first supporting member is pivotably rotatable relative to the second supporting member to form a clip-like mechanism for sandwiching the fabric.

6. The fabric sensor according to claim 1, wherein the thickness measurement mechanism is a displacement sensing element configured to determine the distance between the first sensing surface and the second sensing surface.

7. The fabric sensor according to claim 1, wherein the at least one of the first sensing surface and the second sensing surface is adapted to sense the characteristic of the fabric when the fabric is held between the first sensing surface and the second sensing surface.

8. The fabric sensor according to claim 1, wherein the fabric sensor is of a clip-like mechanism.

9. An electrical appliance comprising the fabric sensor according to claim 1, the processing unit being configured to adjust an operating parameter of the appliance based on said thickness of the fabric and said characteristic of the fabric.

10. An electrical appliance according to claim 9, wherein said electrical appliance is a garment care device corresponding to a dry iron having a soleplate, and wherein said operating parameter is the soleplate temperature.

11. An electrical appliance according to claim 9, wherein said electrical appliance is a garment care device comprising a soleplate and a steam generator, the garment care device being taken among the set of devices defined by steam iron, steam generator, steamer and garment sanitizer, and wherein said operating parameter is taken among the set of parameters defined by soleplate temperature, steam rate and steam temperature.

12. The electrical appliance according to claim 9, further comprising an indicator for providing information to a user, the indicator electrically coupled to the processing unit.

13. A method of determining a fabric type using a fabric sensor, the method comprising:
   holding the fabric between the first sensing surface of a first structural component of said fabric sensor and the second sensing surface of a second structural component of said fabric sensor;
   measuring the thickness of the fabric using a thickness measurement mechanism of said fabric sensor;
   sensing a characteristic of the fabric using at least one of the first sensing surface and the second sensing surface; and
   determining the fabric based on the thickness of the fabric measured by the thickness measurement mechanism and the characteristic of the fabric sensed by the at least one of the first sensing surface and the second sensing surface.

* * * * *